US008095480B2

(12) United States Patent
Kristal et al.

(10) Patent No.: US 8,095,480 B2
(45) Date of Patent: Jan. 10, 2012

(54) SYSTEM AND METHOD TO ENABLE TRAINING A MACHINE LEARNING NETWORK IN THE PRESENCE OF WEAK OR ABSENT TRAINING EXEMPLARS

(75) Inventors: Bruce S. Kristal, Weymouth, MA (US); Rolf J. Martin, Sherman, CT (US)

(73) Assignee: Cornell Research Foundation, Inc., Ithaca, NY (US)

( * ) Notice: Subject to any disclaimer, the term of this patent is extended or adjusted under 35 U.S.C. 154(b) by 889 days.

(21) Appl. No.: 11/831,416

(22) Filed: Jul. 31, 2007

(65) Prior Publication Data
US 2009/0037351 A1  Feb. 5, 2009

(51) Int. Cl.
 *G06F 15/18* (2006.01)
(52) U.S. Cl. .......................................... 706/12
(58) Field of Classification Search .............. 706/11; 381/314
 See application file for complete search history.

(56) References Cited

U.S. PATENT DOCUMENTS

| 5,444,820 | A | 8/1995 | Tzes et al. |
| 5,729,661 | A | 3/1998 | Keeler et al. |
| 5,806,053 | A | 9/1998 | Tresp et al. |
| 5,826,249 | A | 10/1998 | Skeirik |
| 5,966,460 | A | 10/1999 | Porter, III et al. |
| 6,269,351 | B1 | 7/2001 | Black |
| 6,463,438 | B1 | 10/2002 | Veltri et al. |
| 6,556,979 | B1 | 4/2003 | Liu et al. |
| 6,571,228 | B1 | 5/2003 | Wang et al. |
| 6,577,960 | B1 | 6/2003 | Rabelo et al. |
| 6,622,125 | B1 | 9/2003 | Cragan et al. |
| 6,675,162 | B1 | 1/2004 | Russell-Falla et al. |
| 6,735,580 | B1 | 5/2004 | Li et al. |
| 6,769,066 | B1 | 7/2004 | Botros et al. |
| 6,782,375 | B2 | 8/2004 | Abdel-Moneim et al. |
| 6,801,909 | B2 | 10/2004 | Delgado et al. |
| 2002/0010628 | A1* | 1/2002 | Burns .............................. 705/14 |

(Continued)

FOREIGN PATENT DOCUMENTS

| JP | 2003/044750 | 2/2003 |
| WO | 97/30400 | 8/1997 |

OTHER PUBLICATIONS

Mehrotra et al.; 'Elements of artificial neural networks':, 1997, MIT press; pp. 1-344; ISBN 0-262-13328-8.*

(Continued)

*Primary Examiner* — Omar Fernandez Rivas
*Assistant Examiner* — Peter Coughlan
(74) *Attorney, Agent, or Firm* — Fay Kaplun & Marcin, LLP

(57) ABSTRACT

Described is a system and method for training a machine learning network. The method comprises initializing at least one of nodes in a machine learning network and connections between the nodes to a predetermined strength value, wherein the nodes represent factors determining an output of the network, providing a first set of questions to a plurality of users, the first set of questions relating to at least one of the factors, receiving at least one of choices and guesstimates from the users in response to the first set of questions and adjusting the predetermined strength value as a function of the choices/ guesstimates. The real and simulated examples presented demonstrate that synthetic training sets derived from expert or non-expert human guesstimates can replace or augment training data sets comprised of actual training exemplars that are too limited in size, scope, or quality to otherwise generate accurate predictions.

57 Claims, 11 Drawing Sheets

U.S. PATENT DOCUMENTS

| | | | |
|---|---|---|---|
| 2002/0118223 | A1 | 8/2002 | Steichen et al. |
| 2002/0174429 | A1* | 11/2002 | Gutta et al. ............... 725/46 |
| 2003/0171975 | A1 | 9/2003 | Kirshenbaum et al. |
| 2003/0182249 | A1* | 9/2003 | Buczak ..................... 706/15 |
| 2006/0069576 | A1* | 3/2006 | Waldorf et al. ............ 705/1 |
| 2007/0053513 | A1* | 3/2007 | Hoffberg ................... 380/201 |

OTHER PUBLICATIONS

Measuring advertisement effectiveness—a neural network approach: Ramalingam Elsevier, Expert systems and applications, volumn 31 issue 1 Jul. 2006 pp. 159-163. available online Oct. 3, 2005.*

* cited by examiner

Network 300

305

310
312
314
316
318
320

321

0 — 322
1 — 324
2 — 326
3 — 328
4 — 330
5 — 332

SYSTEM AND METHOD TO ENABLE TRAINING A MACHINE LEARNING NETWORK IN THE PRESENCE OF WEAK OR ABSENT TRAINING EXEMPLARS

BACKGROUND

Traditional prediction systems rely on explicitly stated rules in an attempt to indirectly explain or describe the behavior of data and make useful predictions or other decisions. The explicit rules are applied to input data to generate output data, i.e., a prediction, a class assignment or another decision. However, the input data may have subtle and/or unknown relationships that are not recognized by a person/algorithm generating the rules, or that cannot be described by explicit rules. Furthermore, because input data are often noisy, distorted or incomplete, explicit rules may fail to operate correctly, even on patterns broadly similar to data sets from which the explicit rules were constructed. Additionally, some complex problems are non-linear, so that their solutions cannot be easily recognized by humans in the absence of machine intelligence.

Typical neural networks and many other machine learning ("ML") networks do not rely on explicitly stated rules, but construct their own rules by processing input data to generate accurate outputs (i.e., within a predefined error bound). Thus, these networks are often capable of finding unknown relationships between input data and (predicted) outcomes, even when these relationships are highly complex and/or non-linear. Critically, use of ML algorithms requires only the existence of a sufficient and relevant set of prior experiential data (i.e., accurate training exemplars that include examples of input and associated output), and does not require the user to have any knowledge of the rules that govern the system's behavior. Thus, the nature of ML algorithms is such that they learn to identify unknown relationships, which in turn allows networks that utilize ML algorithms (i.e., ML networks) to generalize to broad patterns with incomplete or noisy input data and to handle complex non-linear problems. However, prior to use, the networks must be trained with known input and outcome data to provide predictions with an acceptable level of accuracy. Training ensures that neural and other ML networks are sufficiently accurate so that output data (e.g., predictions, classification decisions or other kinds of decisions) generated for input data with unknown outputs are relatively reliable.

Training the network by supervised learning thus involves sequentially generating outcome data from a known set of input data (where inputs and outputs are correctly matched). These generated outcome data are compared to known sets of outcomes that correspond to known input data. That is, it is expected that the network will generate and thereby predict the known outcomes when receiving the known set of input data. When the known outcomes are not returned, the network may be manipulated (usually automatically) so that further outcome data returned by the network are within the predefined error bound of known outcome data. The network thereby learns to generate known output data (or an approximate equivalent thereof) from known input data, and thereafter may be used for generating outputs from input data without known outputs. Thus, the networks are adaptive since they are reconfigured during training and during actual use to learn new rules or to find new patterns in new data. However, the training typically requires hundreds or thousands of iterations when the network is constructed and may require subsequent re-training during use to maintain the accuracy and reliability of the generated output data.

The power and accuracy of any ML algorithm prior to the invention described has thus been inherently closely tied to the strength of available training sets (i.e., exemplars, a series of inputs and known outcomes used to initially train the ML algorithm), and the closeness of the relationship between the training sets and the situations to be predicted. Furthermore, when training sets are entirely absent, very limited (e.g., small numbers of exemplars, sparsely populated, etc.), of poor quality (e.g., biased, imprecise, skewed, etc.), and/or of limited relevance to the eventual set to be analyzed in the future (e.g., one or more basic situations related to target outcomes have changed), network performance may approximate random behavior and accuracy of network predictions can be very poor.

Thus, the power of all existing approaches to use ML algorithms for classification and prediction has been, prior to the current invention, primarily limited by the strength of the training set. In the absence of accurate training exemplars, or in the presence of sparse or otherwise weak training data, ML algorithms have extremely limited, or no, utility.

SUMMARY OF THE INVENTION

The present invention relates to a system and method for training a machine learning network. The system and method involve utilizing human votes or guesstimates to initialize nodes and/or connections between nodes in a machine learning network to predetermined strength values wherein the nodes and connections represent factors determining network output. The system and method further comprise providing at least one question to a plurality of users, the at least one question relating to at least one of the factors or outcomes. The system and method further relate to receiving at least one of choices and guesstimates from the users in response to the at least one question and performing at least one of i) adjusting the predetermined strength value(s) as a function of the choices or guesstimates provided by experts or non-expert users and ii) adjusting or creating the training input as a function of user choices or guesstimates so that the network can adjust nodes and connections appropriately according to its automatic learning algorithms.

The system includes a host computing device that includes the machine learning network. The host device performs the initializing, the outputting of the at least one question, and the adjusting/creating of the training input. The system also includes a plurality of client computing devices receiving the at least one question and transmitting choices from users thereof in response to the questions.

The present invention also relates to a device including a communications arrangement receiving choices from a plurality of users in response to questions related to a predetermined topic. The device also includes a processor initializing at least one of nodes in a machine learning network and connections between the nodes, to a predetermined strength value. The processor adjusts the predetermined strength value as a function of the choices. The initialization is performed prior to any input of actual input and actual output into the network.

The present invention also relates to a computer-readable medium storing a set of instructions for execution by a processor to perform a method including the step of initializing at least one of nodes in a machine learning network and connections between the nodes, to a predetermined strength value, wherein the nodes represent factors determinative of an output of the network. The method further includes the step of providing at least one question to a plurality of users, the at least one question relating to at least one of the factors. The method also includes the steps of receiving choices from the users in response to the at least one question and adjusting the predetermined strength value as a function of the choices.

DETAILED DESCRIPTION

Figure 1:
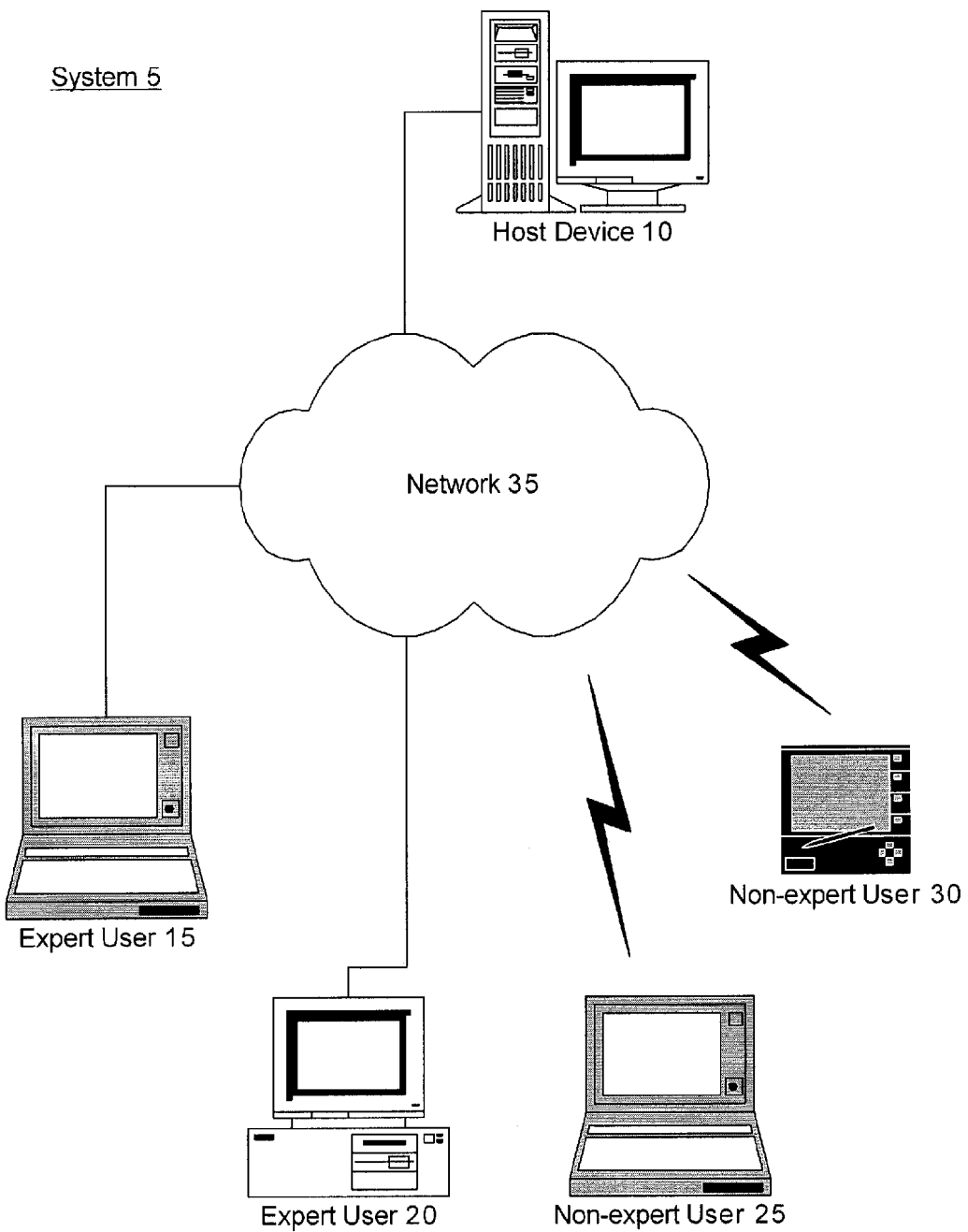
FIG. 1 shows an exemplary embodiment of a system according to the present invention.

The present invention may be further understood with reference to the following description of preferred exemplary embodiments and the related appended drawings. The present invention describes a system and method for training a neural or machine learning ("ML") network. While the first exemplary embodiment will be described with reference to a neural network, those of skill in the art will understand that the present invention may be similarly implemented in a variety of different ML networks and other prediction and/or data analysis systems.

The system and method described below relate generally to the training of an ML network (e.g., an artificial neural network) by using human input (e.g., synthetic data) which reduces the network's learning time and improves problem solving, decision making, classification and prediction accuracy. More specifically, the method comprises training the network with synthetic data sets (e.g., in silico data sets created from user opinions, expert opinions, majority opinions, population opinions, votes, data obtained from other expert systems, data obtained from other learning or predictive algorithms including other ML algorithms, etc.), and/or directly initializing nodes in the network to a set of predetermined strength values based on some perceived knowledge of the problem in question (e.g., the expert opinion, the majority opinions, etc. as above). The synthetic data sets may be used alone or in combination with other synthetic or known data sets that include past examples relevant for the problem the network is designed to solve, such as past stock prices for a network designed to predict future stock prices.

As will be described in the exemplary embodiments below, the preparation of synthetic data sets according to the present invention involves human judgment or independent insight into a problem to achieve better performance. The present invention may be implemented with any learning network or learning algorithm. That is, the present invention does not modify the structure of the network (except to the extent that changing node and connection strengths is considered to be modification of network structure) or require a modification of learning rules (except in the case where learning rules change in response to prior training). Thus, the present invention has no topological constraints and is completely independent of any learning algorithm. This represents one aspect of the novelty of this invention.

Examples of learning algorithms, rules, trees and decision strategies that may be implemented in conjunction with the present invention include, but are not limited to: Bayesnet, ComplementNaiveBayes, NaiveBayes, NaiveBayesMultinomial, NaiveBayesSimple, NaiveBayesUpdateable, HillClimber, RepeatedHillClimber, SimulatedAnnealing, TabuSearch, Logistic, SimpleLogistic, MultilayerPerceptron, VotedPerceptron, RBFNetwork, SMO, lazy.IB1, lazy.KStar, AdaBoostM1, ConjunctiveRule, DecisionTable, JRip, NNge, OneR, PART, ZeroR, J48, LMT, NBTree, RandomForest, RandomTree, REPTree, meta.AttributeSelectedClassifier, CfsSubsetEval, BestFirst, meta.Bagging, ClassificationViaRegression, M5P, CVParameterSelection, meta.Decorate, meta.FilteredClassifier, ClassOrder, supervised.attribute.AttributeSelection, Discretize, meta.Grading, meta.MultiScheme, MultiBoostAB, DecisionStump, NominalToBinary, OrdinalClassClassifier, meta.LogitBoost, meta.MultiClassClassifier, meta.RacedIncrementalLogitBoost, meta.RandomCommittee, meta.StackingC, meta.Stacking, meta.Vote, HyperPipes, VFI, Ridor and Hebbian learning.

FIG. 1 shows an exemplary embodiment of a system 5 for training an ML network (e.g., a neural network) according to the present invention. The system 5 includes a host device 10 connected to one or more users of client devices (e.g., expert users 15 and 20 and non-expert users 25 and 30) via a communications network 35, e.g., a wired/wireless LAN/WAN, an intranet, the Internet, etc. In the exemplary embodiment, the host device 10 may be any type of server or a mainframe, and the client devices may be wired or wireless computing devices which provide a user interface, such as PCs, laptops, PDAs, tablets, etc. The user interface (e.g., a GUI or a piece of paper for a questionnaire or voting ballot) allows the users 15-30 to enter input data that is transferred to the host device 10 and receive output data generated by the host device 10, as will be explained further below. In another exemplary embodiment, the users may each enter the input data directly onto the host device 10 or a user device. In other embodiments, the input of the users 15-30 may be collected and transmitted to the host device 10 by a single user (e.g., an administrator). Thus, the system 5 can be implemented with any number of devices and/or networks, and in some embodiments may only include a single device running an ML network (e.g., the host device 10, a laptop or a PC, etc.).

The host device 10 utilizes the neural or ML network to compile and process the input data. The neural network comprises a set of processing elements or nodes that are generally modeled to perform much as a neuron behaves in the brain. An exemplary node comprises at least one input and at least one output. Each node may be embodied as a storage register in a memory on the host device 10 for storing individual node information, including the strengths, probabilities, and node identification data. In one embodiment, the present invention may include a software package for accepting input data in pre-selected formats (e.g., votes or guesstimates). For example, the software package may utilize a variety of GUIs, transfer functions, configuration/type/number of input, hidden and output layers, etc.

Alternatively, each node may be a specialized processor with memory for storing the individual node information. Since neural networks may perform under a parallel processing architecture, massively parallel processing systems having such specialized processors connected in parallel are well suited for neural network applications such as that to which the present invention is directed.

The input data received from, for example, the users 15-30 and/or from further nodes connected to the node, is used to generate the output data. The output data may be fed to a subsequent node or returned as a result (e.g., a prediction) in response to a query submitted to the neural or other ML network.

In a conventional neural network, each node and connection in the neural network is assigned a predetermined bias and an initial weight. The output data generated by the neural network is then manipulated by adjusting the weights and biases of the nodes and connections during training of the neural network. As described above, training the neural network by supervised learning involves inputting known input data to generate known output data. When the actual output data differs from the known output data by more than a predefined error bound, the weights and/or biases of the nodes are adjusted in an attempt to make the actual output data (e.g., decisions, classifications, predictions) more closely resemble the known output data. The neural network thereby learns to generate the known output data from the known input data, and then may be used for generating reliable outputs from unknown input data.

According to the present invention, the neural network is initialized and/or trains itself as a function of a novel type of synthetic input data received from the users 15-30. In the exemplary embodiments described, the input data is generated based on user voting. The neural network utilizes the votes to assign and adjust the weights of the nodes, strengthening and/or weakening the relationships between the nodes.

Figure 2:
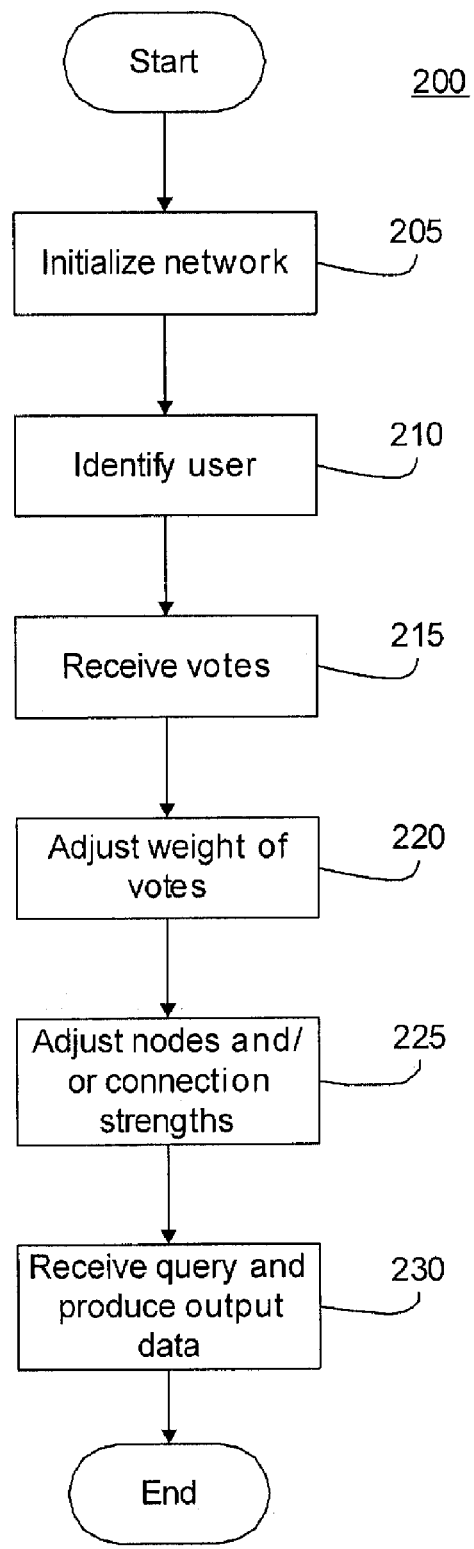
FIG. 2 shows an exemplary embodiment of a method according to the present invention.

FIG. 2 shows an exemplary embodiment of a method 200 for training the neural network according to the present invention. The method 200 will be discussed with reference to a pharmaceutical agent prediction problem in conjunction with FIGS. 3 and 4. However, those skilled in the art will understand that the method 200 may be utilized for any prediction or classification purpose, including, but not limited to, stock analysis, drug development, terrorist activity, event wagering, medical diagnosis, detection of credit card fraud, classification of DNA sequences, speech and handwriting recognition, object recognition in computer vision, game playing and robot locomotion and other problems addressed by neural and other ML networks. In one embodiment of the method 200, only the users provide votes. However, in other embodiments non-users may provide votes or other types of input that introduce human knowledge, wisdom or insight into network connections, including interrelationships between variables of interest in the network.

In the exemplary embodiments described below with reference to FIGS. 2-4, the prediction problem involves predicting the ability of multi-component antioxidant solutions to inactivate or neutralize free radicals. Potential components may include any number of different substances including salts, antioxidants and a variety of amino acids. Neutralizing free radicals is of particular interest because free radicals are believed to be causative agents at least partly responsible for many types of cancer and neurodegenerative and cardiovascular diseases. It is therefore desirable to develop a mixture of substances that effectively neutralize free radicals before they damage vital cell components, in order to prevent or reduce the severity of these diseases. A panel of users comprising experts and/or non-experts (e.g., the users 15-30) is surveyed in order to receive user input for training a neural network 300. In one embodiment, the users may be scientists with varying levels of expertise. For example, the expert user 15 may be a senior faculty member, the expert user 20 may be a junior faculty member, the non-expert user 25 may be a post-doctoral research associate and the non-expert user 30 may be a graduate student. A panel of expert and non-expert scientists at the Burke Medical Research Institute, including senior and junior faculty and post-doctoral and graduate level scientists was actually formed and their votes provided the input used to train the network 300 that generated data for FIGS. 5-7.

Figure 3:
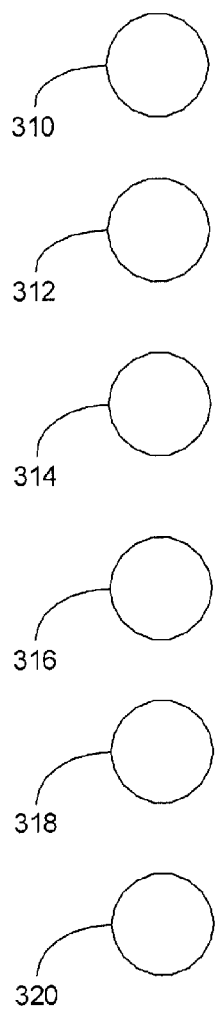
FIG. 3 shows an exemplary embodiment of a network in which the method of FIG. 2 is performed.
Figure 3:
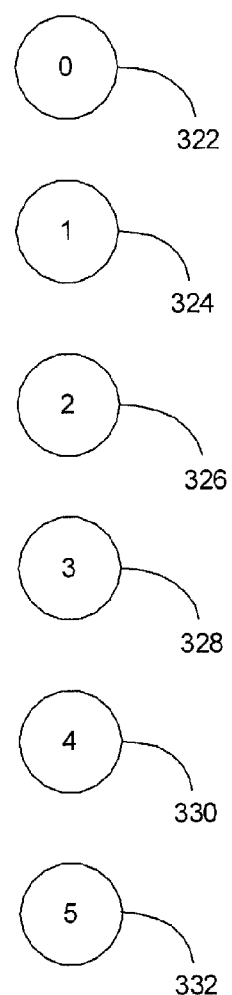

FIG. 3 shows an exemplary embodiment of the network 300 on which the method 200 is implemented. The network 300 is a single layer artificial neural network including an input layer 305 and an output layer 321. That is, there may only be a single layer of connections between the input layer 305 and the output layer 321. In other embodiments, the network 300 may also include nodes to and from one or more hidden layers. Thus, other embodiments may feature multiple connection layers. In the exemplary embodiment, the network 300 utilizes a Hebbian learning algorithm. In addition, other algorithms may be utilized in further embodiments. As shown in FIG. 3, the input layer 305 includes one or more input nodes 310, 312, 314, 316, 318 and 320 which correspond to one or more independent factors such as molecular identity and concentration and the number of free radicals that each type of substance can neutralize. The nodes 310-320 may each represent a specific concentration of a solution component (e.g., one micromolar sodium chloride, one micromolar vitamin C and micromolar vitamin E, respectively).

The output layer 321 includes one or more output nodes 322, 324, 326, 328, 330 and 332 which represent a possible outcome of using the solution components represented by the nodes 310-320. For example, the nodes 322-332 may respectively represent the ability of a particular solution to neutralize zero, one, two, three, four and five micromoles/liter of free radicals.

Referring back to FIG. 2, in step 205 the network 300 is initialized. For an initial use of the network 300, the input layer 305 may be populated by the input nodes 310-320 which correspond to the questions voted on by the users 15-30 (e.g., the various amounts of free radicals that can be neutralized as discussed above). Additionally, a strength of each input node 310-320 may be initialized to a predetermined value (e.g., setting the weight of each connection to 0 or to another constant value). Those of skill in the art will understand that step 205 may only be performed once, because the number of nodes and their corresponding weights and/or biases may be adjusted during use of the network 300, as described herein.

In step 210, the user is identified by, for example, receiving identification data associated with a user profile. Those of skill in the art will understand that the user profile need only be generated once (e.g., if the user is a new user), though it may be subsequently modified either manually or automatically. The user profile may include a name of the user and a self-estimate of the user's own level of expertise in an area most directly related to the problem (e.g., free radical chemistry). After generating the user profile, the user may be provided with and/or create the identification data (e.g., username, password) so that for subsequent uses of the network 300, the user is identified and the user profile is obtained from, for example, a storage arrangement (e.g., a memory, a database, etc.). Alternatively, the user may choose to remain anonymous by only providing an estimate of his or her own level of expertise or by identifying a role performed by the user (e.g., junior level faculty).

In step 215, one or more questions related to the problem are presented to the user, who responds by submitting votes or guesstimates, or variables to be added to the network not previously considered. For example, the users 15-30 may be asked to examine the chemical structure of the solution components and predict or vote on how many free radicals could be neutralized by each micromolar of each solution component. Those of skill in the art will understand that any method of voting or obtaining guesstimates or other feedback or information may be used. For example, the user may be presented with a vote between traditional choices "yes" and "no", several choices representing various quality levels (e.g., Very Good-Poor), true/false, a ranking system, unrelated choices, probabilities, percentages, qualitative and/or quantitative modifiers (e.g., more likely-less likely), an item, a series of items, etc. In addition, the user may also provide variables to be addressed by questions and be added to the network. It is obvious to one skilled in the art that addition of new variables to the network can be accomplished without changing network structure by coding in advance empty nodes and connections that can be used as needed in the future, or that code can be put in place to generate new nodes and connections as needed.

The votes may comprise part or all of a synthetic data set that is input into the network 300 by adjusting appropriate connections between nodes so that relationships between each solution component and the number of free radicals it was thought to be able to neutralize are represented in the network 300. As an alternative, user or non-user votes, guesstimates, etc. can be used to develop synthetic training sets used to train the network 300. It should be noted that the range of possible values represented by the output nodes 322-332 may be limited in advance to 0, 1, 2, 3, 4 or 5 (e.g., during step 205), if there is general agreement amongst the users 15-30 that correct values are within this range. (Those skilled in the art will understand that this type of range is highly problem specific.) The user may also be invited to specify ranges of values within which he or she is certain at a predetermined confidence level (e.g., 90% confidence) that the correct values for each component amount can be found, and to indicate which features of each component examined is in his or her own judgment associated with free radical neutralization capacity.

In some embodiments, the user may be allowed to include explanatory information in support of a particular choice. This information may include, for example, a reference to an opinion of a reputable source and a publication number identifying supporting literature. This information may be distributed or not distributed to other users prior to collecting guesstimates, votes, etc. Alternatively one may train the algorithm, obtain predictions, and then rerun network training after distributing supporting information or information about user guesstimates, etc. Thus, it may be possible to use the present invention to obtain multiple related data sets for differential comparison.

In step 220, the network 300 adjusts the weights of the votes as a function of the corresponding user profile. A multiplier n, selected as a function of the user profile, may be used to increase/decrease weights of the votes submitted by the user. For example, the expert user 15 may report a higher level of expertise than the expert user 20 (e.g., indicating an expertise level of 10 on a scale from 1-10). The multiplier n may then be adjusted according to the self-reported expertise level (e.g., n=10 for the expert user 15). In some embodiments, an additional multiplier may be calculated based on a rank of the user (e.g., postdoctoral research associate, junior faculty member, senior faculty member, etc.). Those of skill in the art will understand that any input-weighting algorithm/multiplier may be used to differentiate influence on the network 300 for different users. In some embodiments, individuals other than the users/non-users who are voting or providing guesstimates may also be used to estimate a voter's level of expertise or to modify the level of expertise chosen by an individual user. Alternatively, comparison of guesstimates, votes, etc. between voters may be used to determine if there are outliers and these outliers may be handled at the discretion of a project manager, principal investigator, etc.

In step 225, the network 300 adjusts the weights and/or biases of the nodes of the nodes 310-320 and 322-332 as a function of the weighted votes. Therefore, the strength of the connections between all nodes can be adjusted and readjusted, and this process of readjustment can occur hundreds or thousands of times during the network learning process. The strengths of the connections may be represented by a weighted average of estimated expertise that is calculated for each solution component as a function of the weighted vote. In embodiments that include the additional multiplier based on rank, a weighted average may be calculated based on both self-reported expertise and rank.

Figure 4:
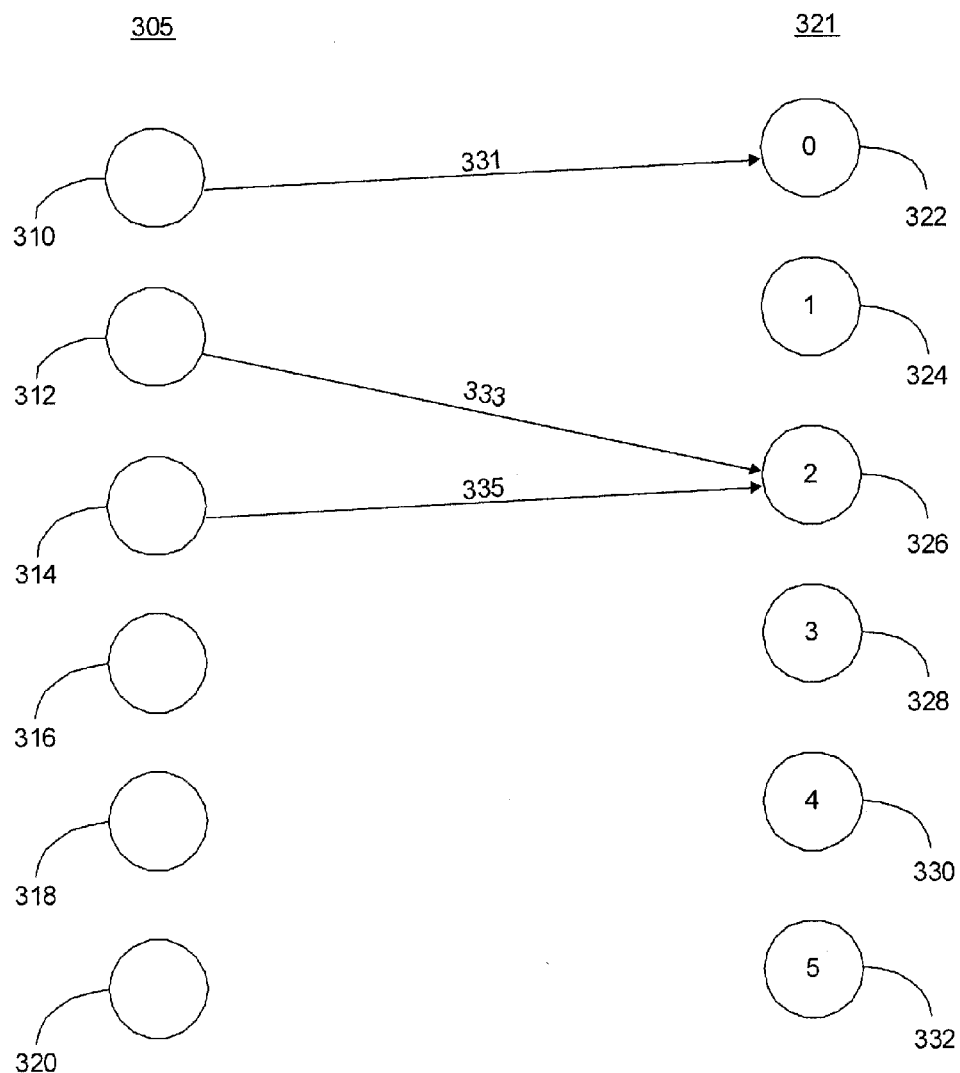
FIG. 4 shows the network of FIG. 3 after performing the method of FIG. 2.

Referring to FIG. 4, the network 300 is shown after the weighted average has been calculated. In the exemplary embodiment shown in FIG. 4, the votes indicate that the users 15-30 estimated that one micromolar of sodium chloride could neutralize zero free radicals. This is shown by a connection 331 between the nodes 310 (sodium chloride) and 322 (zero). A strength of the connection 331 is increased as a function of the weighted vote(s) corresponding to the nodes 310 and 322 (e.g., by assigning a value above zero to the strength of the connection 331). Similarly, connections 333 and 335 are formed from each of the nodes 312 (vitamin C) and 314 (vitamin E) to the node 326 because the users 15-30 indicated a consensus estimate or prediction that each micromolar of these substances could neutralize two free radicals.

In step 225, the network 300 also adjusts the weights and/or biases of the nodes 310-320 and 322-332 by performing the learning algorithm (e.g., the Hebbian algorithm) and going through a plurality of computation cycles (firing or discharge cycles) in which the strengths of the connections 331-335 are adjusted to learn by trial and error how to compute and thereby predict the total free radical neutralization capacity of solutions containing a specified concentration of each of the solution components. In the specific embodiment discussed above, the prediction problem involves predicting the ability of multi-component antioxidant solutions to inactivate or neutralize free radicals. Thus, the network 300 is challenged to learn relationships between three independent factors: molecular identity, concentration and number of radicals each micromolar of a component in a particular solution can neutralize if each component is present in the same or a different concentration than in other solutions. Actual output data of the solutions are fed back into the network 300 for comparison with results predicted by the network and the computation cycles are repeated until a predetermined level of accuracy is achieved (e.g., 90%). In cases where this approach is used in the absence of any training data, learning is based entirely on the synthetic data set provided by the users and the network 300 learns to best model the combined wisdom or opinions of the users.

In step 230, the network 300 receives a query related to the prediction problem. The query may be a request to predict the radical neutralizing capabilities of a specific combination of solution components (e.g., one micromolar of sodium chloride and one micromolar of Vitamin E). The query may be transmitted by any user of the system 5, including an administrator and the users 15-30. In response to the query the network 300 produces output data (e.g., a prediction) based on the strength of the connections between the nodes that the network 300 determines are relevant to the query (e.g., the strength of the connections 331 and 335).

Figure 5:
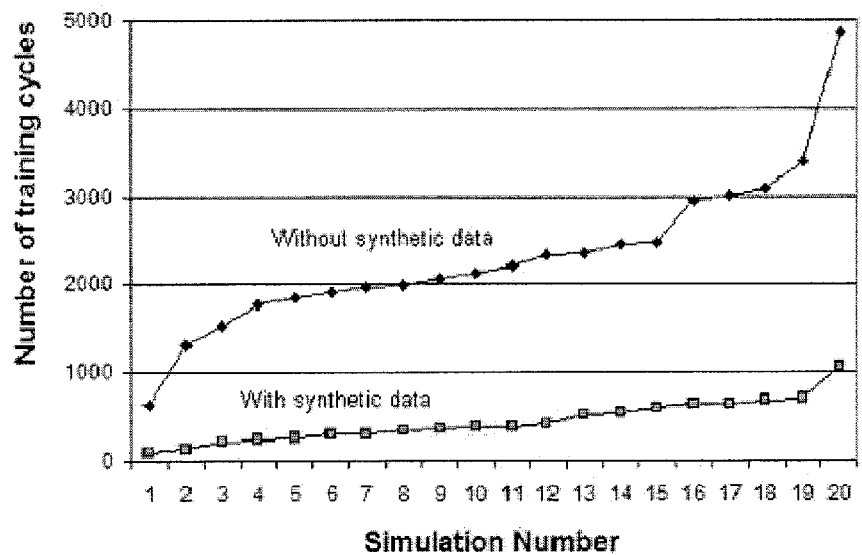
FIG. 5 shows a first graph of simulation results based on the method of FIG. 2.

FIG. 5 is a graph illustrating a first set of exemplary simulation results after applying the method 200 to the network 300. The number of training cycles required to predict free radical neutralization is shown for the network 300 with and without the use of the present invention over a course of twenty simulations. As shown, the number of training cycles required when no synthetic data is used may be between 700 and 5000, whereas the number of required cycles when synthetic data is used is much lower (approximately 500). Although the number of required cycles may vary widely between simulations because the network 300 may occasionally stumble upon correct solutions sooner, the use of synthetic (e.g., guesstimate enhanced) training data consistently results in fewer required cycles compared to when no synthetic data are used. Thus, applying the input of the users 15-30 prior to performing the learning algorithm significantly reduces the number of computation cycles needed to learn accurate prediction.

Input of the synthetic data set according to the present invention may occur at any time before or during learning. In one embodiment, steps 210-225 of the method 200 may be applied after the learning algorithm has commenced. This may occur at a specific time or, in some embodiments, may occur over a period of time (e.g., periodic user input). Furthermore, the synthetic data set may be used on its own or in conjunction with conventional training sets that comprise known data (e.g., a hybrid training set).

Figure 6:
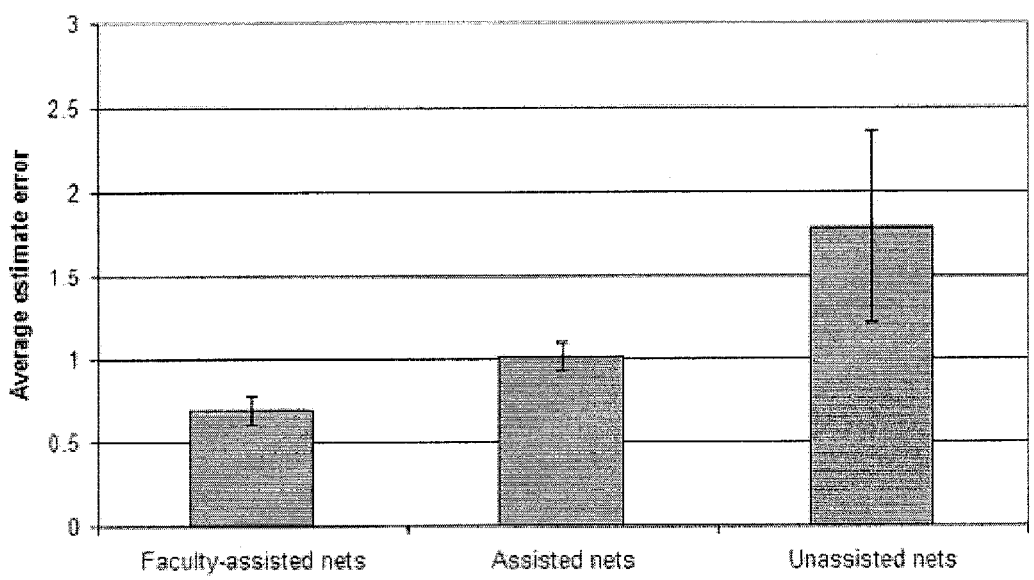
FIG. 6 shows a second graph of simulation results based on the method of FIG. 2.

FIG. 6 is a graph illustrating average estimate error for a second illustrative set of simulation results that were obtained before complete learning had occurred (e.g., before the predetermined accuracy level had been achieved). As shown, an average size of prediction errors made after training with synthetic data sets is less than that of an unassisted network. In particular, the average error when synthetic input is derived entirely from high level experts (e.g., faculty) may be less than half that of the unassisted network.

Figure 7:
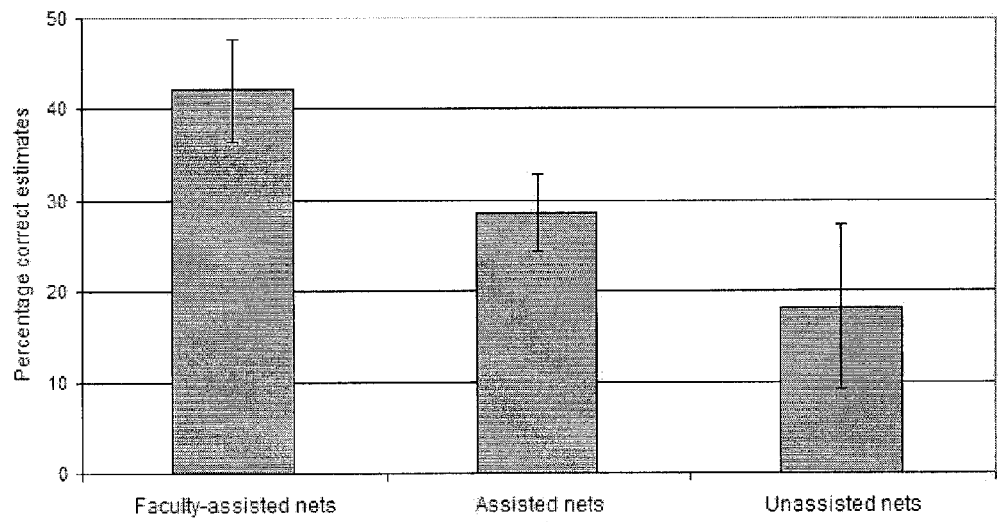
FIG. 7 shows a third graph of simulation results based on the method of FIG. 2.

FIG. 7 is a graph illustrating percentage of correct estimates based on the second set of exemplary simulation results previously discussed with reference to FIG. 6. As shown, networks assisted by synthetic data also produce a higher percentage of correct estimates compared to unassisted networks.

A second exemplary embodiment of the present invention will now be described with reference to the method 200 and general problems for which outcomes are based on a set of factors (e.g., 10 factors) with each factor having its own magnitude and weight. The problem chosen for this second example is to predict or assign one of five classes to an observation based on 10 independent or partly-interrelated factors. This type of problem was chosen because it has a logical structure common to a wide variety of important problems that can be described by a general relation shown in the following equation:

$$\text{Class } O_n = f(y_n), \text{where } y_n = (k_1 x_1 n + k_2 x_2 n + k_3 x_3 n \ldots)$$

It is apparent to one skilled in the art that different forms of this equation, for example, involving different mathematical operations such as multiplication, division, exponentiation, etc. can be used.

According to the equation above, the class of the nth observation ($O_n$) is related to the value of a function y, which itself is determined as the sum of a series of constants $k_1$, $k_2$, $k_3$ ... each multiplied by the value of a series of variables $x_1, x_2, x_3$ ... etc. In the context of the present invention, either the constants (e.g., $k_1$, $k_2$, $k_3$ ... ), the variables (eg, $x_1$, $x_2$, $x_3$ ... ), or both can be estimated by the experts or non-experts who provide the guesstimates. This format is notably amenable to a broad variety of mathematical approaches, including, but not limited to, range setting (e.g., $x_1$ min<$x_1$<$x_1$max), specific distributions (e.g., random numbers combined so as to yield defined distributions, such as the normal distribution), etc. In addition, this format facilitates testing the boundaries of utility for the invention. Thus, for the following example, synthetic data sets were constructed with varying degrees of error (±10-100%) built into synthetic training estimates. Simulations shown below were conducted at 10% maximum error unless otherwise indicated.

The second exemplary embodiment of the invention using synthetic data sets as described above was found to improve accuracy provided that only 50 or fewer accurate training exemplars were available (See FIGS. 8-15). When larger amounts of completely accurate exemplars were added to a training mix, the relatively inaccurate synthetic examples worsened performance because inaccurate input trained the networks to produce relatively inaccurate predictions (See FIG. 8). The benefits of synthetic training data, i.e., the utility of the present invention, are therefore shown to specifically reside in situations in which real training data are relatively scarce—and thus have utility under conditions where machine learning can normally not be applied because only inadequate or inappropriate training exemplars are available. It should be noted that the exact point of the cross-over will depend largely on the accuracy of the training exemplars and the accuracy of expert or non-expert opinion. This general result was replicated for a separate classification problem using a data set (the Iris data set) available from the web site of the Weka Machine Learning Project (http://www.cs.waikato.ac.nz/~ml/).

Figure 12:
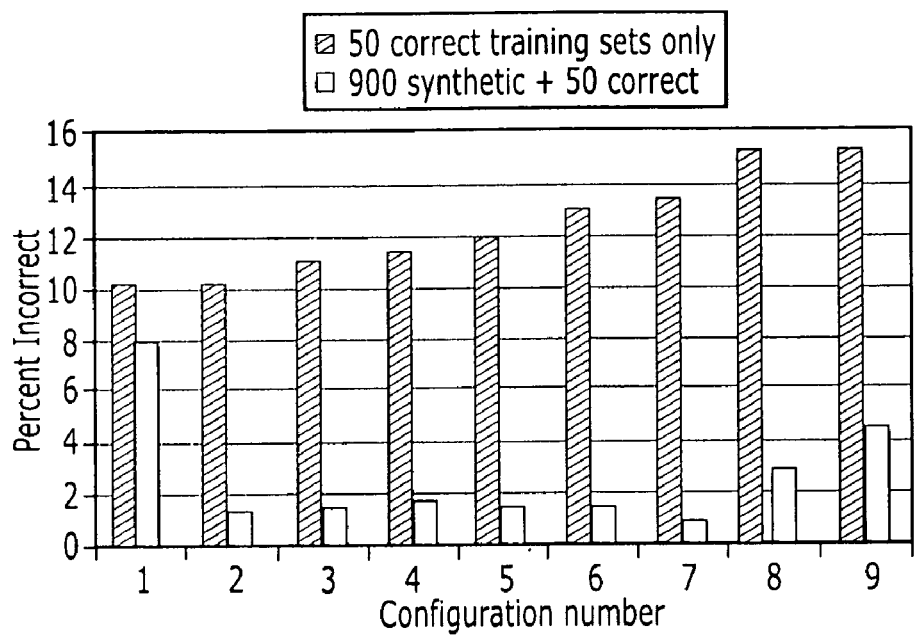
FIG. 12 shows an eighth graph of simulation results based on the method of FIG. 2.
Figure 13:
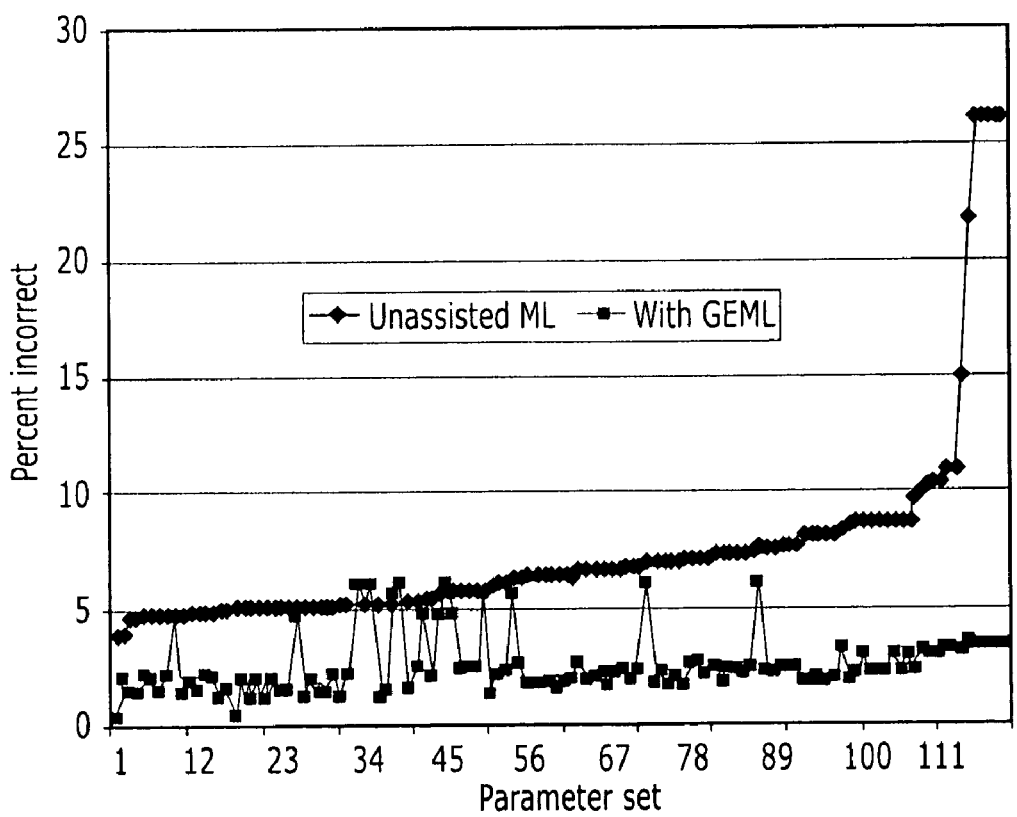
FIG. 13 shows a ninth graph of simulation results based on the method of FIG. 2.
Figure 14:
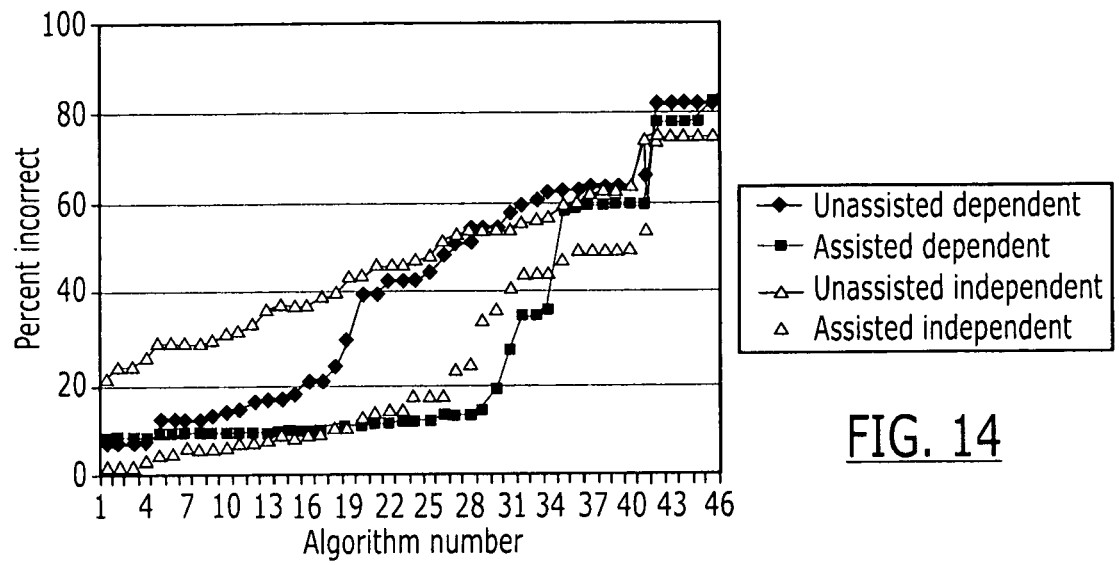
FIG. 14 shows a tenth graph of simulation results based on the method of FIG. 2.

The utility of using synthetic data sets according to the present invention was also investigated using a larger set of 219 ML algorithms, including multi-level network systems that are publicly available at the Weka web site. Data shown in FIG. 9 demonstrates that synthetic data are beneficial primarily when unassisted algorithms make somewhat accurate predictions, here <40% incorrect classifications. Further simulations revealed that benefits accrued through the use of synthetic training data may be retained in the context of (i) algorithm optimization, (ii) non-independent variables, and (iii) imperfect training input. We modeled the effects of optimization for random forest (FIG. 10), radial basis function (FIG. 11), voted perceptron (FIG. 12) and DECORATE algorithms (FIG. 13). In every case, networks receiving synthetic input outperformed those limited to the 50 "real" exemplars. Benefits of the present invention were similar in data sets having variables that were mathematically independent and those whose variables were highly interrelated and thus interdependent (FIG. 14). These results demonstrate that there is no requirement for data independence when synthetic training data are used, and these results are thus consistent with a position that the recognition of such inter-relationships by an expert panel can be advantageously built into synthetic training sets.

Figure 15:
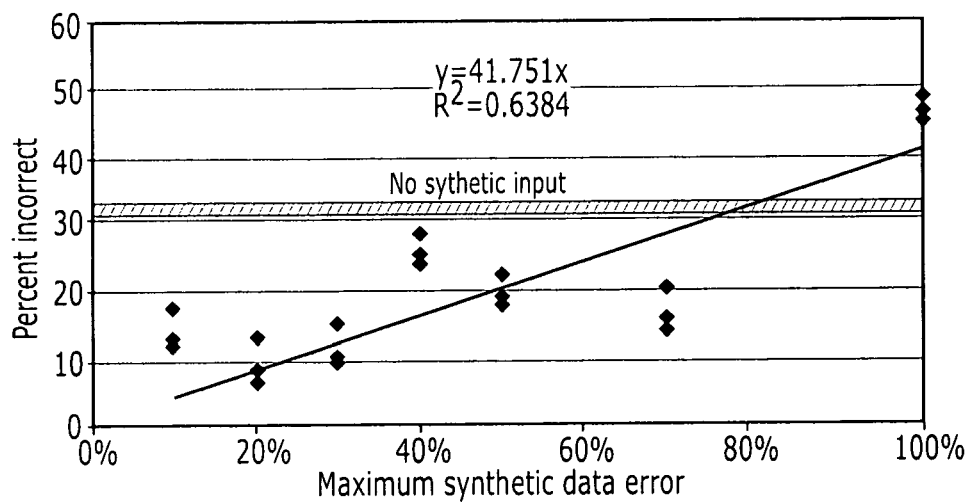
FIG. 15 shows an eleventh graph of simulation results based on the method of FIG. 2.
Figure 16:
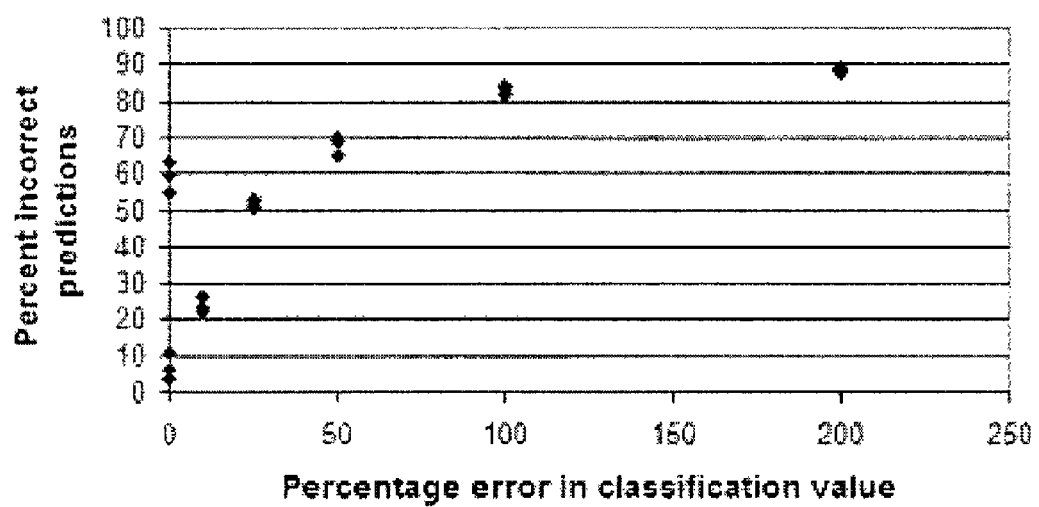
FIG. 16 shows a twelfth graph of simulation results based on the method of FIG. 2.

We next directly addressed the consequences associated with the possibility that expert opinion used to generate synthetic training data is inaccurate. These simulations, shown in FIGS. 15 and 16, indicate that even synthetic data with errors of ~70% above or below correct values are sufficiently useful to enable networks assisted by the present invention to make fewer incorrect predictions than unassisted ML networks. The tolerance of the present invention for inaccurate guesstimates is expected to vary depending on factors such as the relative variation between and within the classes of interest (e.g., intra/inter-class variance). The present invention is also robust against bias errors (e.g., asymmetric quantification) that cause misclassifications. For example, FIG. 16 shows simulation data indicating that systematic errors in values used to assign training example class of up to ~40% can result in improvement in network accuracy.

The utility of the present invention can be seen from the data shown above. Specifically the data show that synthetic training sets have greatest utility under conditions where they are most needed and/or most likely to be used: (i) small or weak training sets (e.g., FIGS. 8-16, where the benefit of synthetic training sets occurs when exemplars are limiting); (ii) algorithms are well-fit to the problem at hand (e.g., FIGS. 9 and 14, where the benefit of synthetic training sets is best seen for algorithms that are appropriate for the problem); (iii) experts provide more accurate estimates (e.g., FIGS. 6 and 7, where better expertise improves ML performance); and (iv) only incomplete or inaccurate training data are available (e.g., FIGS. 8, 15 and 16).

In addition, the advantages provided by guesstimate-enhanced networks are robust under conditions that cannot be directly predicted. For example, in the context of a true de novo ML problem, one skilled in the art will understand that it may be impossible to confidently anticipate the optimal values of different algorithm parameters (FIGS. 10-13). Under these conditions the user is aided by the ability of guesstimate-enhanced networks to act robustly across data sets with sub-optimal parameter settings. Second, in the context of a true de novo ML problem, it may be impossible to confidently anticipate the correlation and interaction structure of the network/data set values of different algorithm parameters (FIG. 14). Under these conditions the user is aided by the ability of the guesstimate-enhanced networks to act robustly across data sets with varying correlation structures between the variables of interest (FIG. 14). Third, in the context of a true de novo ML problem, it may be impossible to confidently anticipate the extent to which any specific given expert or panel member might provide suboptimal/optimal input with respect to the invention. Under these conditions the user is aided by the ability of the guesstimate-enhanced networks to act robustly across data sets with varying levels of accuracy and/or precision (FIGS. 15 and 16).

A third exemplary embodiment of the present invention will now be described with reference to the method 200 and a drug development problem. Specifically, this exemplary embodiment involves drug development in the context of a hypothetical pharmaceutical trial. Similar to the prediction problem discussed above, the drug development problem may utilize synthetic data derived from human experts (e.g., scientists) and/or non-experts (e.g., drug patients). However, in alternative exemplary embodiments, the input data may correspond to output data from another ML network, linking a plurality of ML networks. In the context of the drug development problem, the method 200 may be performed on the network 300 or any other ML network that utilizes a learning algorithm.

Steps 205 and 210 may be substantially similar to those previously described with reference to the prediction problem. Based on the identification data provided in step 210, the user may be directed to a corresponding trial (e.g., the pharmaceutical trial) in which the user is participating. In other exemplary embodiments, the user may have access to any trial being conducted after being authenticated. That is, each trial may utilize its own ML network or a selected portion of a single ML network or set of networks. In the context of the pharmaceutical trial, the user profile may include, but is not limited to, an occupation of the user, (relevant) medical history, age, gender, height, weight, fitness activity, relationship to the trial, etc. For example, the neural network may compile and sort the user profiles based on individuals taking the pharmaceutical, individuals expressing interest in the pharmaceutical, medical professionals prescribing the pharmaceutical, medical professionals researching effects of the pharmaceutical, etc.

In step 215, the user submits votes for a plurality of questions related to the pharmaceutical trial. A generic set of questions applying to all users regardless of the user profile may be presented to the user. Alternatively, the set of questions may be user-specific, generated as a function of the user profile, e.g., different questions for medical professionals and persons taking the pharmaceutical. For example, a medical professional may be asked to vote on symptoms which may be treated by the pharmaceutical. On the other hand, the individual taking the pharmaceutical may be asked to vote on whether the symptoms were actually alleviated while taking the pharmaceutical.

In another exemplary embodiment, the user may estimate an importance (e.g., by ranking, percentages, etc.) of factors for a drug based on Lipinski's Rule of Five. The factors may include, for example, Log P, molecular weight, etc. which are analyzed by the neural network to predict the drug's usefulness.

In step 220, the neural network adjusts the weights of the votes as a function of the corresponding user profile. Similar to the prediction problem, the multiplier n is selected as a function of the user profile and may be used to increase/decrease weights of the votes submitted by the user. For example, if the medical professional has ten years experience with the illness treated by the pharmaceutical and a sales representative only has one year of experience, the votes of the medical professional may count ten times more than the votes of the sales representative (i.e., n=10).

In step 225, the input data is used to adjust (or initialize) weights and/or biases of nodes in the neural network. The neural network then analyzes the strengths of the connections between the nodes to detect relationships among the input data, which may correspond to probabilities of the node's effect on the output data. For example, if the node corresponding to treatment of headaches is strong, when the neural network is queried regarding the pharmaceutical's effectiveness in treatment of headaches the probability corresponding to the node strongly influences the output data produced (step 230). The neural network may also perform a learning algorithm (e.g., the Hebbian algorithm) if actual input and output data (e.g., trial results) are available.

In step 230, the neural network receives the query. Any user, non-user or computing device may submit the query to the neural network. For example, a prospective user of the pharmaceutical or a computing device running a further neural network may submit the query. In response to the query, the neural network returns the output data as a function of the query. In the exemplary embodiment, the output data is a prediction (e.g., an estimate of a drug's efficacy) calculated based on a combination of the strength(s) of connections between the node(s) which were selected by the neural network to respond to the query.

As understood by those of skill in the art, the neural network may discover previously unknown relationships in the input data which may be used in response to multi-faceted queries. For example, the neural network may receive a query for "treatment of headaches+male age 52 with diabetes." While users may have never submitted votes for this specific query, the neural network may combine probabilities from nodes associated with, for example, 'treatment of headaches' and 'males over 50' and 'effect on diabetes.' A resultant probability is generated and returned as the output data. If the query involves a relationship between one or more factors that are not currently a part of the neural network, a new node may be created for each input and/or output associated with the new factor(s) or new combinations of factors. The user may then be asked to submit a vote to establish connections within the neural network for the new node(s). In this manner, new problems may be addressed using synthetic data. Similarly, if a node is no longer required (e.g., because a factor represented by the node is no longer relevant) the node may be removed and the user may resubmit a vote in order to establish new connections or reestablish connections that existed prior to removal of the node.

The present invention may also be utilized to build multiple sets of questions that can lead to sequential sets of synthetic data sets and thereby train ML networks to analyze a variety of problems, where each set of questions and each synthetic data set builds upon the strengths of a previous analysis. Output from a network may be fed back into the same network or further networks. For example, in the context of the drug development problem, a first panel of expert and/or non-expert users can specify an initial set of targets, the same or a second panel can evaluate the targets and candidate compounds in light of preclinical trial results, and the same or a third panel can re-evaluate the targets, candidate compounds and preclinical models in light of clinical trial results. In alternative embodiments, any user may be able to add to a list of available choices (e.g., by specifying a new choice which other users can select). Thus, the present invention may be useful in solving complex problems through the use of synthetic data sets during multiple stages of a problem solving process.

Another example is stock market prediction, where company metrics can be evaluated by a first panel, the same or a second panel can evaluate the selected metrics after considering further data available since the first panel met, and so on, in order to generate a continuously improving set of metrics, network weights and predictions of future stock price changes.

Based on the examples described above, it can be seen that the present invention can be applied to the prediction of future events. The present invention also enables incorporation of data concerning mathematical theories or actual places that have never been formally investigated and situations that have never occurred. It may also be possible to simulate alternative past events or alternative responses to current scenarios.

In another exemplary embodiment, an incentive-based system may be implemented to encourage the users to respond to the questions. The incentive-based system may provide rewards based on a frequency with which the user inputs the identification data, a number of questions the user responds to, etc. The rewards may also be based on a degree to which a user's choices match network predictions that are subsequently proven to be accurate by real-world events. The rewards may include items of monetary value such as money, credit, redeemable items, merchandise, etc. as well as items of perceived value such as promotions, recognition, etc.

As described in the exemplary embodiments above, the present invention enables faster, more accurate and precise problem solving and may be used to supplement ML algorithms in the context of a simple prediction problem involving data sets that include relatively few independent factors. FIGS. 8-14 show that the benefits of the present invention are also present in the context of more complex problems involving partially or fully independent data sets. It has also been shown that the present invention has benefits across a wide range of scenarios that feature different size or quality of available training sets, learning algorithms, network types and other conditions.

Figure 8:
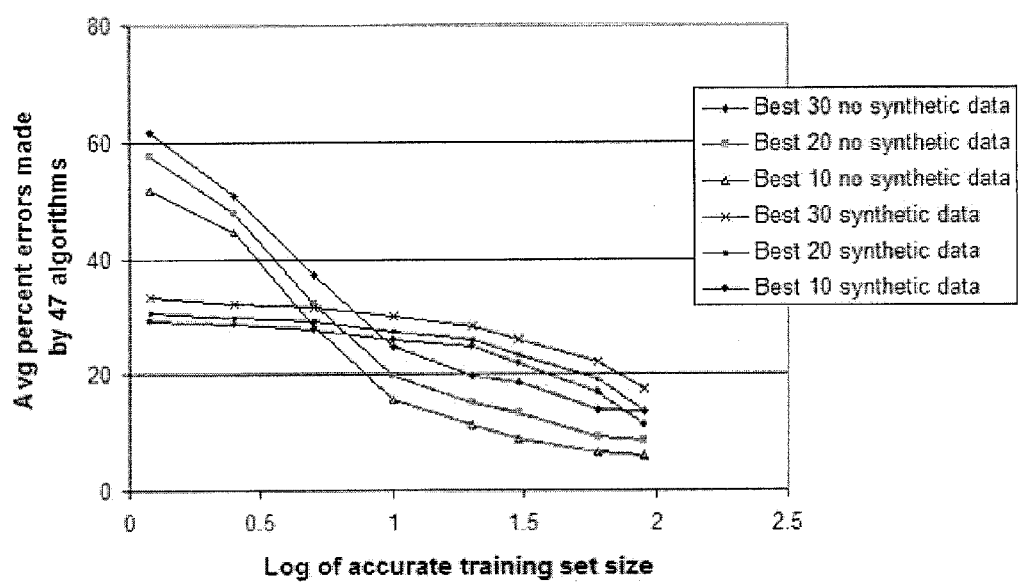
FIG. 8 shows a fourth graph of simulation results based on the method of FIG. 2.

FIG. 8 is a graph of average error percentage versus training set size for forty-six different algorithms. As shown, accuracy is improved when few accurate training sets are available (e.g., less than 50). Thus, the present invention may be especially beneficial when little known data are available for use as training sets.

Figure 9:
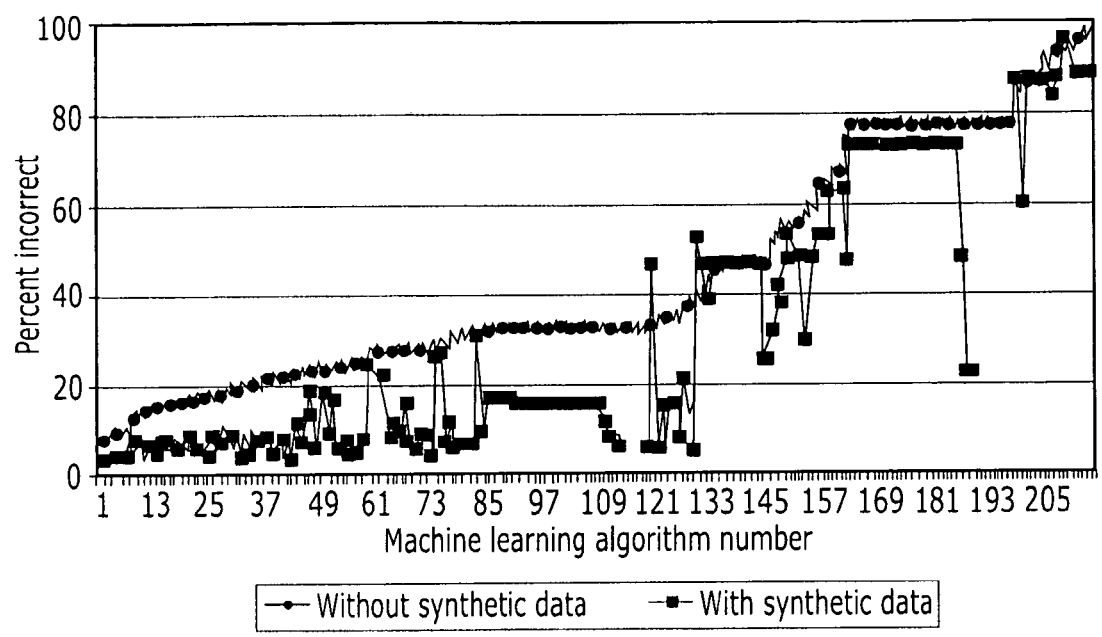
FIG. 9 shows a fifth graph of simulation results based on the method of FIG. 2.

FIG. 9 is a graph of error rate for 215 algorithms. As shown in FIG. 9, algorithms that are capable of reducing the error rate below a certain amount (e.g., 40%) generally benefit the most from synthetic data.

Figure 10:
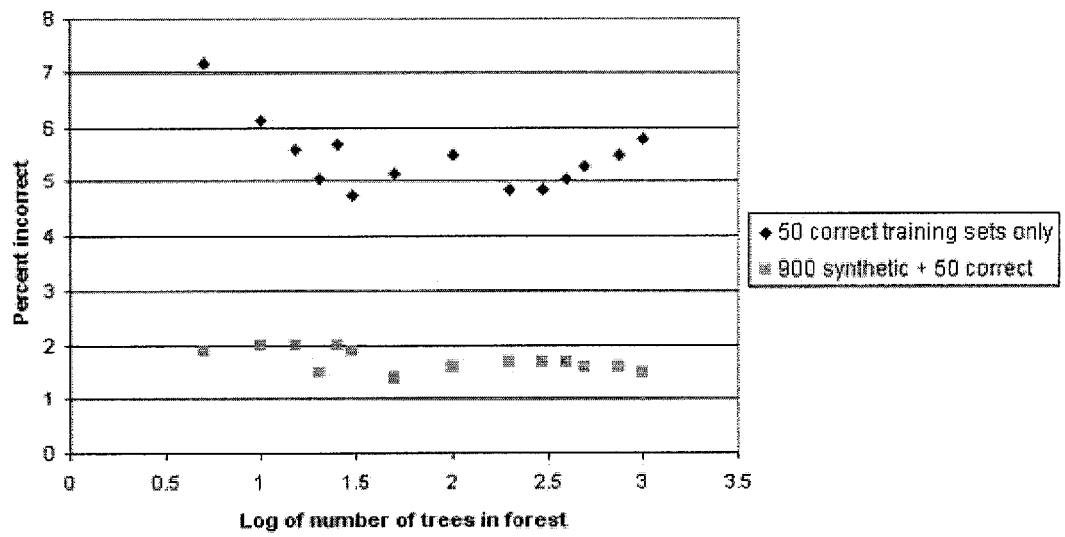
FIG. 10 shows a sixth graph of simulation results based on the method of FIG. 2.
Figure 11:
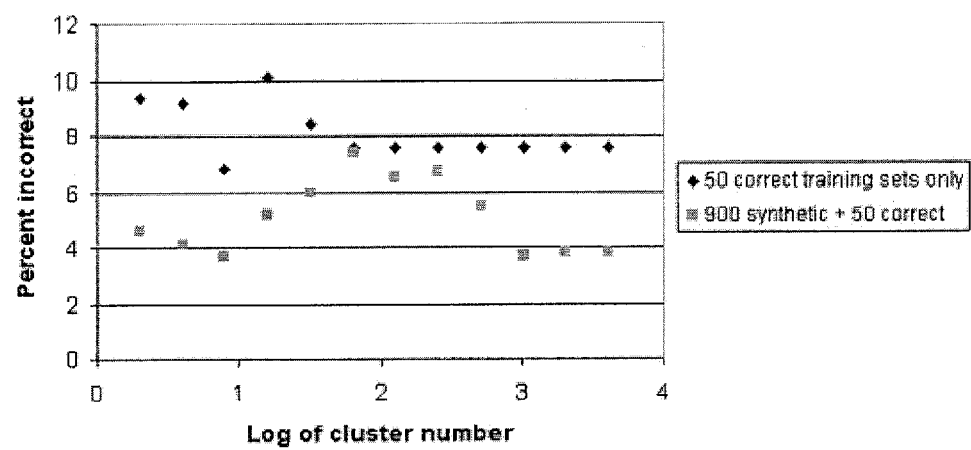
FIG. 11 shows a seventh graph of simulation results based on the method of FIG. 2.

FIG. 10 is a graph of error rate versus decision tree size for a network utilizing a Random Forest learning algorithm. As shown in FIG. 10, error rate may be decreased regardless of tree size when synthetic data are used. FIG. 11 is a graph of error rate versus cluster size for a network utilizing a Radial Basis Function algorithm. FIG. 12 is a graph of error rate versus iteration number for a network utilizing a Voted Perceptron algorithm. Similar to the results of FIG. 10, FIGS. 11 and 12 show that error rate may be reduced regardless of parameter settings for the network. FIG. 13 shows results produced by the DECORATE algorithm executed with 120 different sets of control parameter values showing that input of human guesstimates markedly reduces errors by a relatively large amount in virtually all cases.

Dependent data sets have at least one set of values that are a function of or are highly correlated with one or several other sets of values within the data set. In a real-world scenario, both training sets and test data (e.g., actual data) may be fully or partially dependent. FIG. 14 is a graph of error rate for independent and dependent data sets. As shown in FIG. 14, assisted training sets (i.e., those that include synthetic data sets) may have reduced error rates regardless of data dependency. Thus, there is no requirement for data independence when synthetic data is used.

FIG. 15 is a graph of error rate versus maximum synthetic data error in which the synthetic data sets include user estimates that deviate as much as 70% from correct values. FIG. 15 shows that, despite this inaccuracy, networks trained using these inaccurate synthetic data sets still made fewer incorrect predictions compared to unassisted ML networks.

Similarly, FIG. 16 shows that assisted networks made fewer incorrect predictions compared to unassisted networks even when synthetic training exemplars were misclassified because class assignment boundaries were up to 40% incorrect. In this figure, the percentage of incorrect predictions by unassisted networks is between 55% and 65% whereas assisted networks made just 21% to 27% incorrect predictions when trained with synthetic input generated with 10% classification bias.

In summary, the present invention may be especially useful under the following scenarios: (i) insufficient (e.g., small or weak) training sets, (ii) algorithms are already well-fit to the problem at hand, (iii) knowledgeable experts (or else a panel of people who have little expertise but who together can produce reasonable consensus guesstimates) are available, (iv) algorithms can take advantage of known or unknown data inter-dependencies (e.g., only incomplete or inaccurate training data are available). Furthermore, the present invention's advantages are robust under conditions that cannot be directly predicted such as different algorithm conditions (e.g., preprocessing, number of trees in a random forest, etc.) and differing correlations and interactions between structures of a network/data set.

The invention also allows a series of ML algorithms and expert systems (human or otherwise) to be chained together, in effect combining available "wisdom of crowds" from both ML networks and human experts. An expert panel may thus be used to provide expertise to, for example, an artificial neural network. The output from this network can then be evaluated as a series of probabilities, which in turn can be used to instruct a random forest algorithm, output from which can be re-evaluated by the same or a different expert panel, etc.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method, comprising:
    initializing at least one of i)nodes in a first machine learning network and ii) connections between the nodes, to a predetermined strength value, wherein the nodes represent factors determining an output of the network;
    providing a first set of questions to a plurality of users, the first set of questions relating to at least one of the factors;
    receiving guesstimates from the users in response to the first set of questions;
    adjusting the predetermined strength value as a function of the guesstimates; and
    combining guesstimates received from the users with those of other users to develop and evaluate the network, which is a consensus network.

2. The method according to claim 1, wherein the guesstimates comprise a synthetic data set capable of being applied at any time to the network.

3. The method according to claim 2, further comprising combining the synthetic data set with additional training data derived from a non-human source.

4. The method according to claim 1, further comprising:
    after the step of adjusting, providing the network output to a second machine learning network;
    providing a second question to a plurality of users of the second network; and
    receiving at least one of choices and guesstimates from the users of the second network in response to the second question.

5. The method according to claim 4, wherein the second network is the same as the first network.

6. The method according to claim 4, wherein at least one of the users of the first network is the same as a user of the second network.

7. The method according to claim 1, further comprising:
    receiving user information from each of the users; and
    applying a weight to the guesstimates from a particular user as a function of the user information.

8. The method according to claim 7, wherein the user information is one of a self-reported expertise level and a user role indicative of expertise.

9. The method according to claim 1, wherein the at least one question is directed to one of stock analysis, drug development, terrorist activity, event wagering, medical diagnosis, detection of credit card fraud, classification of DNA sequences, speech and handwriting recognition, object recognition in computer vision, game playing and robot locomotion.

10. The method according to claim 1, further comprising:
    providing a reward to a selected user based on at least one of a frequency with which the selected user inputs the guesstimates, a number of questions to which the selected user responds and whether the selected user includes explanatory information in support of a particular choice.

11. The method according to claim 10, wherein the explanatory information includes at least one of a reference and an identification of supporting literature.

12. The method according to claim 10, wherein the reward has at least one of monetary and perceived value.

13. The method according to claim 1, further comprising:
    displaying at least one of a valid choice and a valid guesstimate option to a user who has yet to respond to the question.

14. The method according to claim 1, further comprising:
    receiving explanations from the users regarding the guesstimates.

15. The method according to claim 14, wherein the explanations include at least one of supporting literature and an opinion of a source.

16. The method according to claim 1, wherein the predetermined strength value is one of a constant and a series of related constants.

17. The method according to claim 1, wherein a question provided to the plurality of users includes choices that are one of true/false, yes/no, multiple choice, a ranking inquiry and a rating inquiry.

18. The method according to claim 17, wherein the users are provided an opportunity to add to a list of possible choices.

19. The method according to claim 1, wherein the guesstimates include at least one of true/false, yes/no, a quality level, a probability, a percentage, a rank, a qualitative modifier, a quantitative modifier, an item and a series of items.

20. The method according to claim 1, further comprising generating a training set as a function of the user responses so that the adjusting of the predetermined strength values is performed automatically in accordance with a learning algorithm.

21. The method according to claim 1, further comprising:
    receiving a query;
    identifying connections between nodes in the network related to the query;
    generating a response to the query as a function of strength values of the identified connections; and
    outputting the response.

22. The method according to claim 21, wherein the connections include connections within and between input and output node layers.

23. The method according to claim 22, wherein the connections further include connections within and between a hidden node layer and each of the input and output node layers.

24. The method according to claim 21, wherein the users comprise a first user panel and the query is specified by a second user panel.

25. The method according to claim 21, wherein the outputted response is fed as input into a further machine learning network.

26. The method according to claim 21, further comprising:
feeding the response back into the network;
providing at least one of the first set of questions to, and receiving at least one of choices and guesstimates from, a third user panel; and
adjusting the strength value of the nodes as a function of the third user panel's choices/guesstimates and the actual input/output.

27. The method according to claim 21, further comprising:
selecting at least one of the users based on a degree to which the selected user's choice matches the response; and
providing a reward to the selected at least one user.

28. A device, comprising:
a communications arrangement receiving guesstimates from a plurality of users in response to questions related to a predetermined topic; and
a processor initializing at least one of i) nodes in a machine learning network and ii) connections between the nodes, to a predetermined strength value, the processor adjusting the predetermined strength value as a function of the choices, wherein the initialization is performed prior to any input of actual input and actual output into the network;
wherein the network is a consensus network and the users are able to combine their own guesstimates with those of other users to develop and evaluate the network.

29. The device according to claim 28, wherein the guesstimates comprise a synthetic data set that is capable of being applied to the network at any time.

30. The device according to claim 28, wherein the communications arrangement receives user information from each of the users, and the processor applies a weight to the guesstimates from a particular user as a function of the user information provided by the particular user.

31. The device according to claim 30, wherein the user information is one of a self-reported expertise level and a user role indicative of expertise.

32. The device according to claim 30, further comprising:
a memory storing the questions, wherein the questions are directed to a topic that is capable of being analyzed by a machine learning algorithm.

33. The device according to claim 32, wherein the topic is one of stock analysis, drug development, terrorist activity, event wagering, medical diagnosis, detection of credit card fraud, classification of DNA sequences, speech and handwriting recognition, object recognition in computer vision, game playing and robot locomotion.

34. The device according to claim 28, wherein the questions include choices that are at least one of true/false, yes/no, multiple choice, a ranking inquiry and a rating inquiry.

35. The device according to claim 28, wherein the guesstimates are at least one of true/false, yes/no, a quality level, a probability, a percentage, a rank, a qualitative modifier and a quantitative modifier.

36. The device according to claim 28, wherein the processor receives and inputs a query into the network to identify connections between nodes related to the query and generates a response to the query as a function of respective strength values of the identified connections.

37. A system, comprising:
a host computing device including a machine learning network, the host computing device initializing at least one of i) nodes in the network and ii) connections between the nodes, to a respective predetermined strength value, the host computing device outputting questions, each question corresponding to at least one of the connections; and
a plurality of client computing devices receiving the questions, the client computing devices transmitting guesstimates from users thereof in response to the questions, wherein the host computing device adjusts the predetermined strength value as a function of the guesstimates, and
wherein the network is a consensus network and the users are able to combine their own guesstimates with those of other users to develop and evaluate the network.

38. The system according to claim 37, wherein the guesstimates comprise a synthetic data set that is capable of being applied at any time to the network.

39. The system according to claim 37, wherein the host computing device receives user information from at least one of the users and applies a weight to the guesstimates from a particular user as a function of the user information corresponding to the particular user.

40. The system according to claim 39, wherein the user information includes one of a self-reported expertise level and a user role indicative of expertise.

41. The system according to claim 37, wherein, when the host computing device receives a query from one of the client computing devices, the host computing device identifies connections between nodes in the network related to the query, generates a response to the query as a function of respective strength values of the identified connections and transmits the response to the one of the client computing devices.

42. The system according to claim 37, wherein the machine learning network executes at least one of the following types of machine learning algorithms, rules, trees and decision strategies: Bayesnet, ComplementNaiveBayes, NaiveBayes, NaiveBayesMultinomial, NaiveBayesSimple, NaiveBayesUpdateable, HillClimber, RepeatedHillClimber, SimulatedAnnealing, TabuSearch, Logistic, SimpleLogistic, MultilayerPerceptron, VotedPerceptron, RBFNetwork, SMO, lazy.IB1, lazy.KStar, AdaBoostM1, ConjunctiveRule, DecisionTable, JRip, NNge, OneR, PART, ZeroR, J48, LMT, NBTree, RandomForest, RandomTree, REPTree, meta.AttributeSelectedClassifier, CfsSubsetEval, BestFirst, meta.Bagging, ClassificationViaRegression, M5P, CVParameterSelection, meta.Decorate, meta.FilteredClassifier, ClassOrder, supervised. attribute.AttributeSelection, Discretize, meta. Grading, meta.MultiScheme, MultiBoostAB, DecisionStump, NominalToBinary, OrdinalClassClassifier, meta.LogitBoost, meta.MultiClassClassifier, meta.RacedIncrementalLogitBoost, meta.RandomCommittee, meta.StackingC, meta.Stacking, meta.Vote, HyperPipes, VFI, Ridor and Hebbian learning.

43. The system according to claim 37, wherein additional nodes and connections are formed in the network in response to the guesstimates.

44. The system according to claim 37, wherein the guesstimates include estimates of plausible ranges for key values, and wherein upper and lower boundaries of the ranges define part of a training set.

45. The system according to claim 37, wherein the guesstimates are combined with output from a further machine learning network to generate a hybrid training set comprising both human and artificial machine learning choices.

46. The system according to claim 45, wherein a plurality of training sets are generated based on values close to those of the hybrid training set.

47. The system according to claim 37, wherein additional user guesstimates are made after examining output from the machine learning network.

48. The system according to claim 37, wherein the users are able to adjust a weight of their own guesstimates before the combining.

49. The system according to claim 37, wherein the guesstimates are made based on a perceived relevancy of specific input, and wherein the choices generate corresponding connections between nodes in a hidden layer of the network.

50. A non-transitory computer-readable medium storing a set of instructions for execution by a processor to perform a method comprising:
    initializing at least one of i) nodes in a machine learning network and ii) connections between the nodes, to a predetermined strength value, wherein the nodes represent factors determinative of an output of the network;
    providing at least one question to a plurality of users, the at least one question relating to at least one of the factors;
    receiving guesstimates from the users in response to the at least one question;
    adjusting the predetermined strength value as a function of the choices; and
    combining guesstimates received from the users with those of other users to develop and evaluate the network, which is a consensus network.

51. The computer-readable medium according to claim 50, wherein the method executed by the processor further comprises:
    receiving user information from each of the users; and
    applying a weight to the guesstimates from a particular user as a function of the user information.

52. The computer-readable medium according to claim 50, wherein the method executed by the processor further comprises:
    providing a reward to at least one selected user based on at least one of a frequency with which the selected user inputs the guesstimates, a number of questions to which the selected user responds and whether the selected user includes explanatory information in support of a particular choice.

53. The computer-readable medium according to claim 50, wherein the method executed by the processor further comprises:
    displaying valid choices to a user who has yet to respond to the question.

54. The computer-readable medium according to claim 50, wherein the method executed by the processor further comprises:
    receiving explanations from the users regarding the guesstimates.

55. The computer-readable medium according to claim 50, wherein the method executed by the processor further comprises:
    receiving a query;
    identifying connections between nodes in the network related to the query;
    generating a response to the query as a function of strength values of the identified connections; and
    outputting the response.

56. The computer-readable medium according to claim 55, wherein the method executed by the processor further comprises:
    feeding the outputted response back into the network;
    providing the at least one question to, and receiving guesstimates from, a third user panel; and
    adjusting the strength value of the nodes as a function of the third user panel's guesstimates and the actual input/output.

57. The computer-readable medium according to claim 55, wherein the method executed by the processor further comprises:
    selecting at least one of the users based on a degree to which the selected user's guesstimates match at least one of real world events and true training exemplars; and
    providing a reward to the selected user.

* * * * *